United States Patent
Le Biez et al.

(10) Patent No.: US 6,830,428 B2
(45) Date of Patent: Dec. 14, 2004

(54) ABRADABLE COATING FOR GAS TURBINE WALLS

(75) Inventors: Philippe Le Biez, Draveil (FR); Joël Vigneau, Champcueil (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/292,506

(22) Filed: Nov. 13, 2002

(65) Prior Publication Data

US 2003/0175116 A1 Sep. 18, 2003

(30) Foreign Application Priority Data

Nov. 14, 2001 (FR) .............................. 01 14698

(51) Int. Cl.$^7$ ................................ F01D 11/12
(52) U.S. Cl. ................ 415/173.4; 415/174.4; 416/228
(58) Field of Search ............ 415/173.4, 173.5, 415/173.6, 174.4, 174.5; 416/192, 228

(56) References Cited

U.S. PATENT DOCUMENTS

| | | | |
|---|---|---|---|
| 3,365,172 A | * | 1/1968 | McDonough et al. ....... 415/117 |
| 4,103,905 A | | 8/1978 | Desmond et al. |
| 4,239,452 A | | 12/1980 | Roberts, Jr. |
| 4,329,308 A | | 5/1982 | Langer et al. |
| 4,466,772 A | | 8/1984 | Okapuu et al. |
| 4,594,053 A | | 6/1986 | Söhngen |
| 4,652,209 A | | 3/1987 | Buddenbohm |
| 5,476,363 A | * | 12/1995 | Freling et al. ............ 415/173.1 |
| 5,951,892 A | | 9/1999 | Wolfla et al. |
| 6,155,778 A | | 12/2000 | Lee et al. |
| 2001/0004436 A1 | | 6/2001 | Chasripoor et al. |

FOREIGN PATENT DOCUMENTS

| | | |
|---|---|---|
| DE | 84 11 277 | 8/1986 |
| EP | 0 716 218 | 6/1996 |
| EP | 1 111 195 | 6/2001 |
| GB | 840 573 | 7/1960 |
| GB | 2 152 079 | 7/1985 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

The coating of abradable material presents cavities opening out into the surface of the coating, the cavities extending over a fraction of the thickness of the coating and being defined by walls which form a plurality of continuous paths at the inside surface of the annular portion between the axial end faces thereof, and which form an angle of not less than 5° relative to the general direction of end portions of blades that might come into contact with the abradable material.

16 Claims, 2 Drawing Sheets

ABRADABLE COATING FOR GAS TURBINE WALLS

BACKGROUND OF THE INVENTION

The invention relates to abradably-coated walls for gas turbines, in particular for aeroengines, for example compressor casings and turbine rings, and in particular it relates to the casings of high pressure compressors and the rings of high pressure turbines.

A turbine ring is made up of a plurality of contiguous ring sectors which surround a set of rotary blades driven by the combustion gases. In order to ensure that ring sectors retain their strength at the high temperatures encountered in operation (possibly reaching 1600° C. to 1650° C. for a high pressure turbine), and given that the structural portions thereof are made of metal, it is known to provide them with thermal protection on their surfaces exposed to the combustion gases. Typically, the thermal protection can be constituted by a layer of refractory ceramic or metal composition conventionally formed by physical deposition, for example by thermally spraying such a deposit using a plasma.

A compressor casing also comprises one or more annular structures, which may themselves be made up of a plurality of contiguous annular sectors and which are situated facing one or more sets of blades with relative rotary movement taking place between the blades and the annular structure.

In order to ensure that the turbomachine has the best possible efficiency, it is essential to avoid or at least to minimize gas leakage between the tips of the blades and the facing surface of the compressor casing or of the turbine ring, since such leaks do not contribute to operating the turbomachine. The search for no clearance or for minimum clearance means that contact is inevitable between the tips of the blades and the material situated facing them. Because this material is conventionally very hard, such contact can destroy the tips of the blades.

In order to solve that problem, proposals have been made to improve the abradability of the material situated facing the blades, i.e. in order to improve its ability to be struck physically by the tips of the blades without giving rise to major wear thereof. One known technique for this purpose and applicable to a coating material for a turbine ring consists in imparting a high degree of porosity thereto, for example by mixing hollow beads or polymer particles with the composition used for making the material. The pores obtained by the voids created by the hollow beads or by the polymer particles disappearing at high temperature can occupy 10% to 20% or even at most about 30% of the total volume of the material. Reference can be made in particular to patent document GB 2 152 079.

Although creating pores leads to a material that is softer, and thus that presents improved abradability, that is nevertheless to the detriment of its behavior at high temperatures.

OBJECT AND SUMMARY OF THE INVENTION

An object of the invention is to provide an annular part for a gas turbine, such as a compressor casing or a turbine ring, the part having a coating which presents a high degree of abradability, while possibly also offering effective thermal protection.

This object is achieved by an annular portion mounted facing a set of rotary gas turbine blades, said annular portion being provided with a coating of abradable material presenting cavities that open to the surface of the coating, extend over a fraction of the thickness of the coating, and are defined by walls which form a plurality of continuous paths on the inside surface of the annular portion between its axial end faces, and which, in accordance with the invention, form an angle of at least 5° relative to the general direction of the end portions of the blades liable to come into contact with said abradable material.

Providing cavities in the coating serves to increase its abradability considerably. Because of the presence of the cavities, the external portion of the coating in which the cavities are formed can present a void content, a kind of "porosity", that is greater than 40%, for example lying in the range 40% to 60%, without harming the mechanical strength of the coating.

The inclination of the walls of the cavities through an angle of not less than 5° relative to the end portions of the blades that might come into contact with the abradable material makes it possible to limit any rubbing that might occur between the end portions and the abradable material, and thus limit wear of said end portions.

The fact that the walls of the cavities form a plurality of continuous paths between the faces of the ring serves to prevent leakage passages forming through the surface of the ring in the event of the tip of a blade penetrating into the coating, thereby ploughing a circumferential furrow passing through the walls of the cavities.

The depth of the cavities is selected to be greater than the estimated maximum penetration depth of the tips of the blades in the coating, while nevertheless remaining limited in order to avoid weakening the coating. A value lying in the range 0.3 millimeters (mm) to 1 mm is preferred.

Preferably, at least a portion of the walls have main directions forming an angle lying in the range 0° to 20° relative to a radial plane.

In an embodiment of the invention, the cavities are constituted by cells, preferably of polygonal section in order to conserve wall thickness that is relatively constant.

Thus, the cells may be quadrangular in section, for example they may be square and separated by walls forming a grid on the surface of the coating.

In another embodiment of the invention, the cavities are constituted by continuous circumferential grooves separated by walls that form continuous circumferential ribs extending along zigzag or undulating lines.

The invention also provides a gas turbine including a set of rotary blades surrounded by an annular portion as defined above.

The blades may have tips with chamfered rims so as to facilitate penetration into the abradable coating.

BRIEF DESCRIPTION OF THE DRAWINGS

The invention will be better understood on reading the following description given below by way of non-limiting indication and with reference to the accompanying drawings, in which.

DETAILED DESCRIPTION OF EMBODIMENTS OF THE INVENTION

Figure 1:
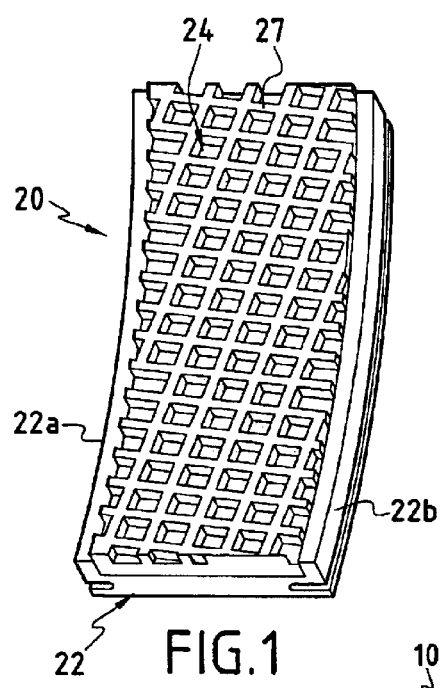
FIG. 1 is a highly diagrammatic perspective view of a sector of a turbomachine turbine ring in an embodiment of the invention.
Figure 2:
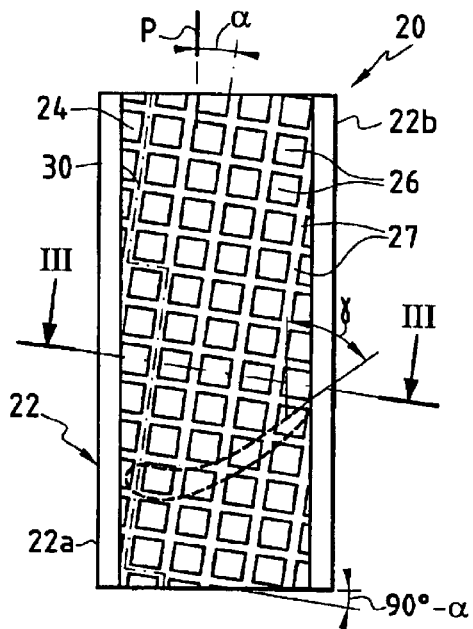
FIG. 2 is a developed view of the abradable coating of the ring sector shown in FIG. 1.
Figure 3:
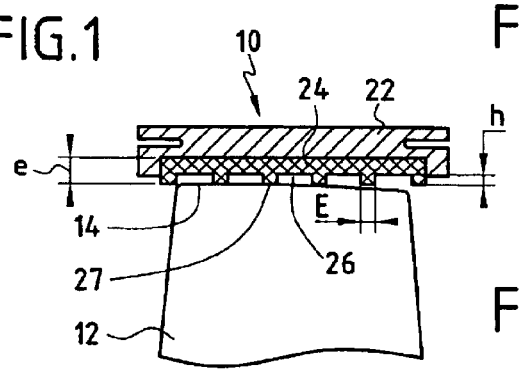
FIG. 3 is a half-view in section of a turbine ring made up of sectors of the kind shown in FIG. 1.
Figure 4:
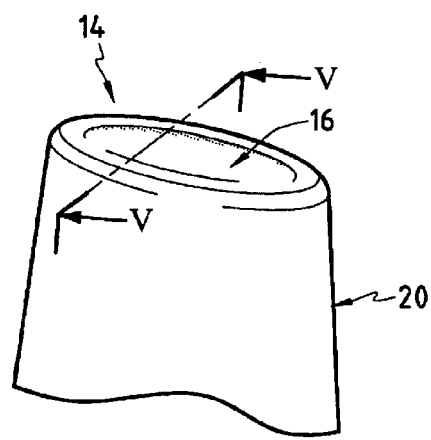
FIG. 4 is a diagrammatic view in perspective of a detail of the tip of a high pressure turbine blade.

FIGS. 1 and 2 are a perspective view and a developed face view of a ring sector 20 for use in building up a turbine ring 10 of the kind shown in section in FIG. 3 by placing a plurality of sectors end to end in the circumferential direction, for example to build up a high pressure turbine ring of a turbomachine. The ring 10 surrounds the rotary assembly formed of a plurality of blades 12, with the clearance between the inside surface of the ring and the tips 14 of the blades being zero or almost zero.

The ring sector 20 comprises a structural metal support 22 provided on the inside with an abradable thermal protection coating 24 into which the blades 10 can penetrate part way without suffering excessive wear. In the example shown, the abradable coating extends between two rims 22a and 22b forming the axial ends of the ring sector.

The support 22 is made of a metal material capable of withstanding relatively high temperatures, for example a superalloy based on Ni or Co.

The abradable coating 24 is made of a material that presents satisfactory behavior at high temperatures. Various materials can be envisaged, depending on the temperatures encountered in operation, for example:

a superalloy of the MCrAlY type (where M is a metal selected from Fe, Ni, and Co); and
  ceramics, e.g. zirconia ($ZrO_2$) possibly containing other refractory oxides as additives, e.g. yttrium oxide ($Y_2O_3$).

The abradable coating material is deposited on the support 20 by a physical deposition method, for example by thermally projecting powder using known techniques of plasma deposition, or by brazing preforms obtained by methods for working powders, including stages of molding, removing binder, and sintering.

Cavities 26 are formed in the abradable material, the cavities opening out into the exposed surface thereof. In the example of FIGS. 1 to 3, the cavities are cells 26 of quadrangular section, and more particularly of square section. They extend to a depth h which is less than the total thickness e of the coating.

The depth h is not less than, and is preferably slightly greater than, the estimated maximum penetration depth of the blades in the abradable material in the event of interference between the rotary blades and the turbine ring. The depth h is selected to have a value lying in the range 0.3 mm to 1 mm, and preferably in the range 0.4 mm to 0.8 mm. The total thickness e preferably lies in the range 0.8 mm to 1.2 mm.

The cells 26 may be formed by removing material after the thermal protection material has been deposited. Various known machining methods can be used such as milling, drilling, electro-erosion, electrochemistry, chemical machining, laser machining, abrasive water jet machining, ultrasound machining. In a variant, the cells 26 may be formed by molding a preform constituted by powders that are to form the abradable material, using a mold having relief that is the inverse of the cells.

The cells 26 are separated by walls 27. The walls 27 are of a thickness E enabling them to present sufficient mechanical strength. Depending on the material used for the coating 24, E is selected to have a value lying in the range about 1 mm to about 2 mm. With cavities of quadrangular section, the walls 27 form a rectangular grid having two main directions forming angles $\alpha$ and $90°-\alpha$ relative to a plane perpendicular to the axis of rotation of the rotary assembly, such as the radial plane P.

Relative to the axial dimension of the ring 10, the cavities are selected to have dimensions such that the walls 27 form a plurality of continuous paths that are spaced apart from one another between the axial end edges of the ring. Such a continuous path is represented by chain-dotted line 30 in FIG. 2. As a result, in the event of interference between the blades and the turbine ring giving rise to a continuous furrow being formed in the abradable material, the risk of significant peripheral leakage by the gas traveling along the turbine is avoided.

In accordance with the invention, steps are taken to ensure that none of the directions of the walls is substantially parallel to the general direction of the end portions of the blades that might come into contact with the abradable material, so as to limit any rubbing between said end portions and the abradable material, thereby limiting wear. Thus, the angle $\alpha$ differs by not less than 5° from the setting angle $\gamma$ for the end portions of the blades as shown by fine lines in FIG. 2.

Furthermore, the angle $\alpha$ is selected so as to place the cell walls so that all points on the end of a blade that comes to interfere with the abradable coating encounter substantially the same volume of abradable material. Thus, the angle $\alpha$, which is the smaller of the two angles formed by the main directions of the walls relative to the plane P, is preferably selected to lie in the range 0° to 20°, and more particularly in the range 5° to 15°.

Figure 5:
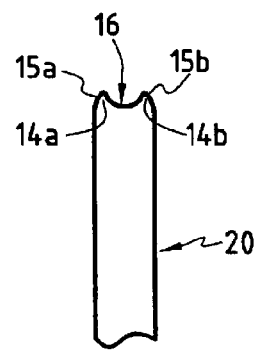
FIG. 5 is a section view on plane V—V of FIG. 4.

As shown in FIG. 5, one or two rims 14a, 14b of the tip of the blade 14 on either side of the cavity 16 or "bathtub" present on said tip may be chamfered (at 15a, 15b) so as to facilitate penetration into the abradable material.

In the portion of the abradable coating that has the cavities extending through its thickness, the shape of the cells makes it possible to achieve a "porosity" or void content of at least 40%, and this can easily be as great as 60%. The term "porosity" or "void content" is defined herein as being the percentage of the volume occupied by the cells in the external portion of the abradable coating that is liable to enter into interference with the tips of the blades.

Naturally, equivalent results could be obtained with polygonal cavities of sections other than square or quadrangular.

It should be ensured that the walls between the cavities, or at least most of them, have a direction that is not parallel to a radial plane.

Figure 6:
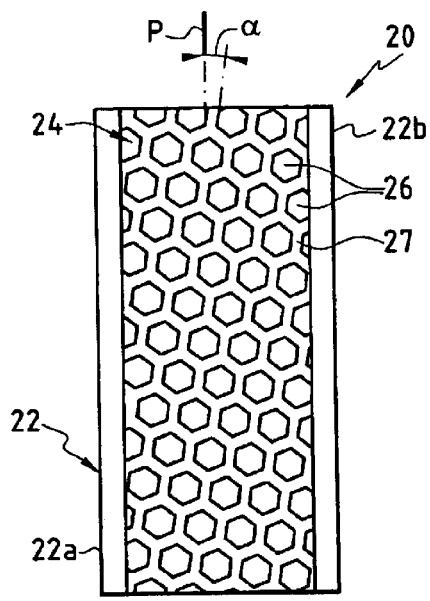
FIGS. 6 to 8 are developed views of other embodiments of abradable coatings for turbine ring sectors.

Thus, FIG. 6 shows an abradable coating which differs from that shown in FIG. 2 by the cells 26 being hexagonal in section with two parallel sides forming the angle $\alpha$ relative to the plane P.

Figure 7:
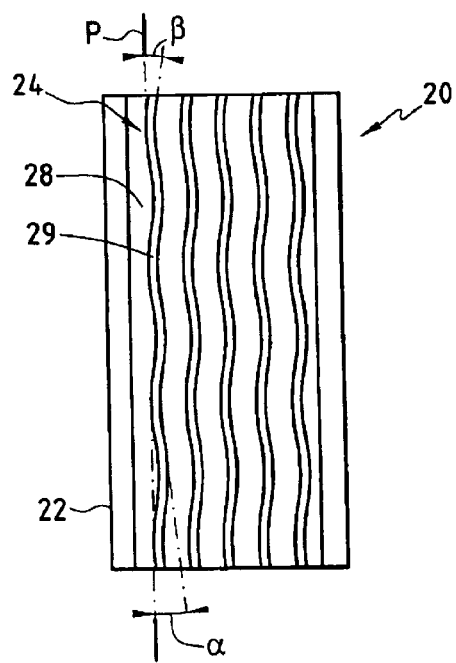
Figure 8:
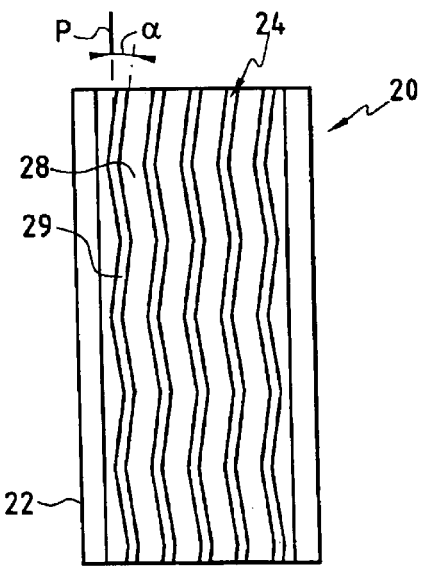

FIGS. 7 and 8 show another embodiment of the invention which differs from that of FIGS. 1 to 3 in that the cavities 28 are not in the form of cells, but are in the form of continuous circumferential grooves that are separated by walls 29.

The walls 29 form a plurality of ribs extending continuously in a circumferential direction, such that a plurality of mutually spaced apart walls 29 lie between the end edges of the turbine ring.

The walls 29 may have a general direction that is parallel to a radial plane P or that is inclined at a small angle relative thereto.

In order to avoid presenting a continuous circumferential wall facing a rim of a blade tip that might interfere with the ring, the walls 29 follow a path that is not rectilinear.

In the example of FIG. 7, the walls 29 follow an undulating path. The angle α formed by the tangent to the walls 29 relative to a radial plane P varies over the range 0° to β. A maximum value for β is preferably selected to be an angle of 20°.

In the example of FIG. 8, the walls 29 follow a zigzag path. The angle α formed by the wall segment 28 relative to a radial plane P is preferably selected as mentioned above for the embodiment of FIG. 2, i.e. lying in the range −20° and +20°, and more particularly in the range −10° and +10°.

Tests

A ring sector was made as shown in FIG. 1 with an abradable material constituted by a NiCrAl alloy containing hollow beads of alumino-silicate material. The abradable material was deposited by plasma deposition on the metal support.

Cavities in the form of square section cells were formed by machining using electro-erosion. For this purpose, a suitable tool (electrode) was made by milling grooves in the form of a grid in a block of copper. The cells were obtained by plunging the electrode on a single occasion into the abradable material.

Cavities of side equal to 2 mm were formed to a depth of 0.7 mm, the cavities being separated by walls having a thickness of 1 mm, with the total width of the abradable coating being equal to more than 20 mm.

A test was performed using a rotor having three blade ends distributed at its periphery, turning at a circumferential speed of 200 meters per second (m/s), with a rate of penetration into the abradable material of 0.15 millimeters per second (mm/s) and a total penetration depth of 0.5 mm.

By way of comparison, a test was performed without forming cells in the abradable material, the other test conditions being identical.

The table below gives the results of the measurements performed on tangential, radial, and axial forces during penetration and on the wear at the end of the blade after the test.

|  | Abradable material without cells | Abradable material with cells |
|---|---|---|
| Tangential force (Newtons (N)) | 15.1 | 0.29 |
| Radial force (N) | 69.3 | 32.5 |
| Axial force (N) | 13.3 | 5.4 |
| Blade end wear (mm) | 0.32 to 0.64 | 0.14 |

With an abradable material made in accordance with the invention, the forces measured were divided by 2 at least and the wear observed was divided by about 3.

Although the above description envisages applying the coating of the invention to a turbine ring, the invention is also usable for the abradable coatings of compressor casings. Under such circumstances, the abradable coatings do not have the same thermal protection function as is required by turbine rings. They can be made, for example, out of an alloy based on aluminum or nickel, optionally made with the addition of organic particles, graphite particles, organic hollow beads, and/or ceramic hollow beads. Apart from the composition, the other characteristics of the abradable materials can be identical to those of turbine ring coatings as described above.

What is claimed is:

1. An annular portion mounted facing a set of rotary gas turbine blades, said annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle in a range between 0° and 20° relative to the general direction of the end portions of the blades liable to come into contact with said abradable material, and the cavities are constituted by polygonal cells quadrangular in section.

2. The annular portion according to claim 1, wherein the cavities are of a depth lying in the range 0.3 mm to 1 mm.

3. The annular portion according to claim 1, wherein the external portion of the coating in which the cavities are formed present a void content lying in the range 40% to 60%.

4. The annular portion according to claim 1, wherein the cavities are constituted by continuous circumferential grooves separated by walls forming continuous circumferential ribs.

5. The annular portion according to claim 4, wherein the ribs follow zigzag lines.

6. A turbine ring for a gas turbine, the turbine ring being in accordance with claim 1.

7. A compressor casing for a gas turbine, the compressor casing including an annular portion in accordance with claim 1.

8. A turbine having an annular portion facing a set of rotary blades, wherein the annular portion is in accordance with claim 1.

9. The annular portion according to claim 1, wherein the cavities are square in section.

10. The annular portion according to claim 1, wherein the angle is in the range between 5° and 15°.

11. An annular portion mounted facing a set of rotary gas turbine blades, said annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle in a range between 0° and 20° relative to the general direction of the end portions of the blades liable to come into contact with said abradable material, the cavities are constituted by continuous circumferential grooves separated by walls forming continuous circumferential ribs, and the ribs follow undulating lines.

12. A turbine having an annular portion facing a set of rotary blades, the annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle in a range between 0° and 20° relative to the general direction of the end portions of the blades liable to come into contact with said abradable material, wherein the blades have tips presenting rims that are provided with chamfers.

13. An annular structure disposed opposite to rotary gas turbine blades, said annular structure comprising:
   a structural member; and
   a protection coating disposed on a surface of said structural member, said coating comprising cavities extending over a fraction of a thickness of said coating and walls forming a plurality of continuous paths on an inside surface of the annular structure facing said rotary gas turbine blades, wherein the continuous paths form an angle of at least 5° relative to a plane perpendicular to an axis of rotation of the gas turbine and the cavities comprise polygonal cells quadrangular in section.

14. An annular portion mounted facing a set of rotary gas turbine blades, said annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle of at least 5° relative to the general direction of the end portions of the blades configured to come into contact with said abradable material, the cavities are constituted by continuous circumferential grooves separated by walls forming continuous circumferential ribs, and the ribs follow undulating lines.

15. An annular portion mounted facing a set of rotary gas turbine blades, said annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle of at least 5° relative to the general direction of the end portions of the blades configured to come into contact with said abradable material, the cavities are constituted by continuous circumferential grooves separated by walls forming continuous circumferential ribs, and the ribs follow zigzag lines.

16. A turbine having an annular portion mounted facing a set of rotary gas turbine blades, said annular portion being provided with a coating of abradable material, said coating presenting cavities that open to the surface of the coating, extend over a fraction of the thickness of the coating, and are defined by walls which form a plurality of continuous paths on the inside surface of the annular portion between its axial end faces, wherein said cavity walls form an angle of at least 5° relative to the general direction of the end portions of the blades configured to come into contact with said abradable material and the turbine blades have tips presenting rims that are provided with chamfers.

* * * * *